United States Patent [19]

Matsuyama et al.

[11] 3,725,237
[45] Apr. 3, 1973

[54] APPARATUS FOR MEASURING ION ACTIVITY OF SOLUTIONS

[75] Inventors: George Matsuyama, Fullerton; Grover F. Lindell, Anaheim, both of Calif.

[73] Assignee: Beckman Instruments, Inc., Fullerton, Calif.

[22] Filed: Oct. 26, 1970

[21] Appl. No.: 83,884

[52] U.S. Cl. .................................................. 204/195 L
[51] Int. Cl. ............................................... G01n 27/46
[58] Field of Search...204/1 T, 195 R, 195 L, 195 M, 204/180 P, 301

[56] References Cited

UNITED STATES PATENTS

| | | | |
|---|---|---|---|
| 3,488,276 | 1/1970 | Tarsey | 204/301 |
| 3,562,130 | 2/1971 | Hoole et al | 204/195 M |
| 3,590,810 | 7/1971 | Kopecky | 204/195 M |
| 3,607,700 | 9/1971 | Tosteson | 204/195 L |
| 3,607,710 | 9/1971 | Farren et al | 204/195 M |
| 3,616,409 | 10/1971 | Tosteson | 204/195 L |

*Primary Examiner*—T. Tung
*Attorney*—Thomas L. Peterson and Robert J. Steinmeyer

[57] ABSTRACT

An apparatus for measuring the ion activity of a solution in which the ion sensitive barrier of the apparatus comprises a unitary membrane assembly in which an organic sensing solution is held between two hydrophilic membranes, preferably cellophane and cellulose acetate, respectively. Means are provided for replaceably mounting the membrane assembly in a sample flow cell which permits sample solution to flow past the cellophane membrane of the assembly and an electrolyte solution to contact the cellulose acetate membrane.

10 Claims, 6 Drawing Figures

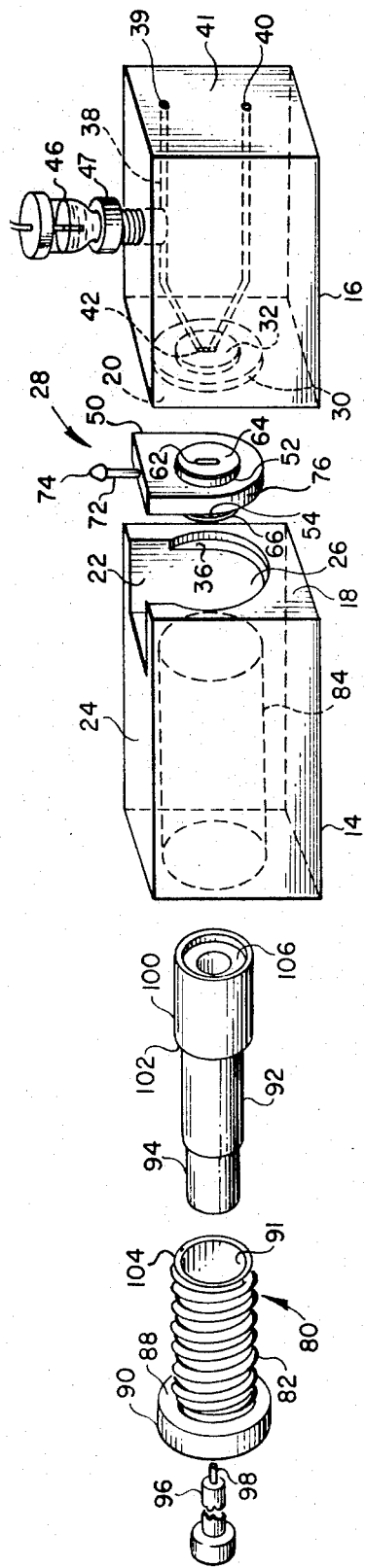

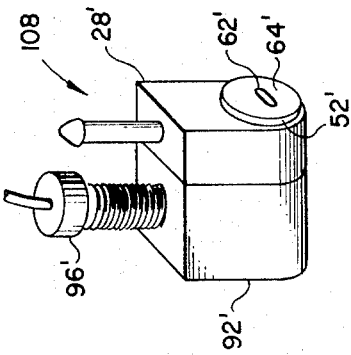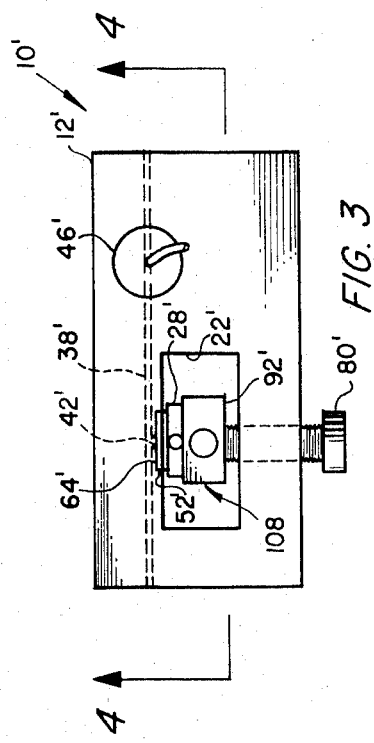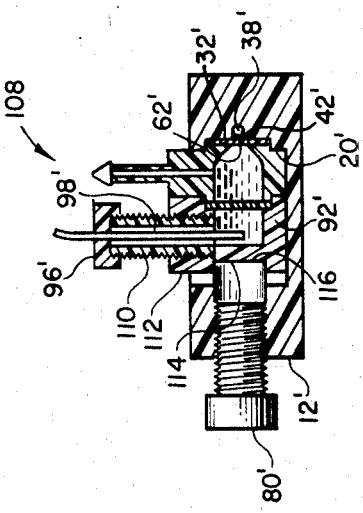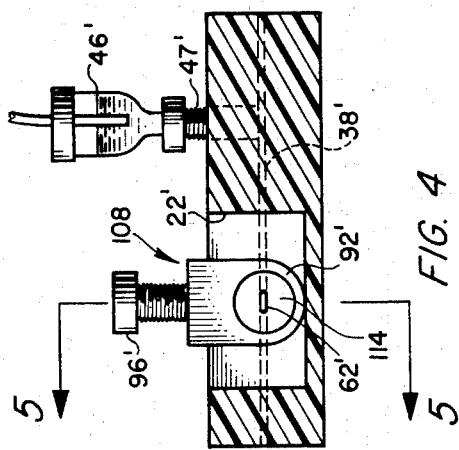

APPARATUS FOR MEASURING ION ACTIVITY OF SOLUTIONS

BACKGROUND OF THE INVENTION

1. Field of the Invention

This invention relates generally to an apparatus for measuring the ion activity of solutions and, more particularly, to an improved membrane assembly for use in such an apparatus.

2. Description of the Prior Art

The present invention comprises an improvement upon the ion measuring apparatus disclosed in Canadian Patent No. 844,128 to Daniel C. Tosteson. Such apparatus includes three blocks which are held together by four bolts passing through the blocks. Cellulose membranes (commonly referred to as cellophane) are interposed between the blocks so as to confine an organic sensing solution within a chamber in the intermediate block, thereby providing an ion sensitive barrier. The sensing solution comprises a mixture of the phospholipid lecithin, a macrocyclic compound such as nonactin, monactin, dinactin or valinomycin, and the solvent decane. A sample passage extends through one of the outside blocks and opens at the face thereof adjacent one of the cellophane membranes so that the membrane will be bathed by the sample solution. An electrolyte chamber is formed in the other outside block so that a suitable electrolyte solution will bathe the other cellophane membrane of the assembly. An internal half cell is mounted in the electrolyte chamber. The internal half cell, electrolyte solution and the ion sensitive barrier consisting of the organic ion sensing solution trapped between the two cellophane membranes provide an ion measuring electrode assembly. While this form of assembly is generally satisfactory, it has the disadvantage that in order to replace the ion sensing solution in the intermediate block, the entire assembly must be disassembled which requires the removal of the four bolts therefrom. This is time consuming and results in both electrolyte and sensing solution spilling over the surrounding area. It is therefore the object of the present invention to provide an improved electrode assembly of the type employing a liquid ion sensing solution which is easy to disassemble and will overcome the problem of spillage which is inherent in the apparatus disclosed in the aforementioned Canadian patent.

SUMMARY OF THE INVENTION

In accordance with the principal aspect of the present invention, there is provided an improved apparatus for measuring the ion activity of solutions in which there is employed a liquid ion sensing solution as the ion sensitive barrier in the apparatus. The sensing solution is provided in a container having a chamber extending therethrough, the opposite ends of which are closed by suitable hydrophilic membranes, preferably cellophane and cellulose acetate, respectively. These membranes are bonded to the container to provide a sealed unitary membrane assembly. A single screw element is provided for replaceably mounting this membrane assembly within a cavity in the apparatus. The apparatus is constructed to permit sample solution to flow past one of the membranes of the membrane assembly and an electrolyte solution to contact the other membrane. Since the membrane assembly is a unitary sealed assembly, there is no requirement for three separate chamber blocks, two separate membranes and a plurality of bolts to hold the same together as in the apparatus disclosed in the aforementioned Canadian patent. The membrane assembly may be easily and rapidly withdrawn from the apparatus without spillage of liquid over the surrounding area. Thus, the apparatus of the present invention is easy to handle and manipulate, thereby facilitating more rapid and efficient measurements of the ion activities of solutions.

BRIEF DESCRIPTION OF THE DRAWINGS

FIG. 1 is an exploded view of an apparatus constructed in accordance with the present invention;

FIG. 2 is a longitudinal vertical sectional view taken through the center of the apparatus shown in FIG. 1, when fully assembled;

FIG. 3 is a top plan view of another and preferred form of the apparatus of the present invention employing a composite electrolyte container and membrane assembly;

FIG. 4 is a vertical sectional view taken along lines 4—4 in FIG. 3;

FIG. 5 is a vertical sectional view taken along lines 5—5 in FIG. 4; and

FIG. 6 is a perspective view of the composite electrolyte container and membrane assembly employed in the apparatus shown in FIGS. 3–5.

DESCRIPTION OF THE PREFERRED EMBODIMENTS

Referring now to FIGS. 1 and 2 of the drawings in detail, there is shown one form of the apparatus of the present invention, generally designated 10, which includes a body 12 made up of two sections 14 and 16. These sections are bonded together at their mating faces 18 and 20, respectively, by a suitable cement. In FIG. 1, the sections 14 and 16 are shown separated in order to more clearly illustrate the structural features of the invention. A cavity 22 is formed in the section 14 of body 12. This cavity opens at the face 18 of section 14 and at the top 24 thereof. Preferably the bottom 26 of the cavity is semi-cylindrical to facilitate the proper positioning within the cavity of the membrane assembly, generally designated 28, to be described in detail later.

A circular projection 30 is formed on the face 20 of body section 16. A coaxial circular recess 32 is formed in the projection 30. A segmented circular recess 36 is formed in the surface 18 of body section 14. This recess is complementary to the circular projection 30 on body section 16 so that when the two sections 14 and 16 are brought together, the projection 30 will be tightly received in the recess 36 in the body section 14.

A sample flow passage 38 extends through the body section 16 of the apparatus. The ends 39 and 40 of the passage 38 open at the end face 41 of the section 16 while an intermediate portion of the passage opens in a somewhat elongated vertical cavity 42 that opens at the bottom 44 of recess 32. A reference electrode 46 is mounted in body section 16 by means of a threaded sleeve 47. The electrode is provided at its lower end with a liquid junction structure 48 which is positioned to contact sample passing through the passage 38.

The membrane assembly 28 comprises a generally upright element 50 having formed at its lower portion a pair of outwardly extending circular projections 52 and 54. The diameter of projection 52 is slightly less than that of the circular recess 32 in body section 16 so that the projection may be slidably received within the recess when the assembly 28 is mounted in the cavity 22. A chamber 56 extends through the member 50 and opens at the opposed parallel flat surfaces 58 and 60 of the projections 52 and 54, respectively. Preferably the end 62 of the chamber 56 adjacent to the recess 32 is in the form of an elongated vertical passage which is complementary to the sample cavity 42 which opens at the bottom of the recess 32. Hydrophilic ion-permeable membranes 64 and 66, which will be described in detail later, are bonded to the opposed surfaces 58 and 60, respectively, of element 50, thus closing the chamber 56 and providing a sealed container for holding a suitable ion-sensing solution 68. The bottom of chamber 56 is sloped at 69 between its opposite ends for a purpose which will be described later. A vertical passage 70 extends upwardly from the chamber 56 through the element 50 and an extension 72 thereof to provide a filling port for filling the chamber 56 with the ion-sensing solution. This port is closed by a suitable cap 74.

As best seen in FIG. 2, the cavity 22 is sufficiently large to permit the membrane assembly 28 to be slidably mounted therein from the top of the apparatus. The bottom 76 of the assembly 28 is curved to generally mate with the semi-cylindrical bottom surface 26 of the cavity, thus facilitating positioning of the assembly within the cavity. When the membrane assembly 28 is positioned with the bottom 76 thereof nesting against the bottom 26 of the cavity, the assembly may be moved in the rightward direction as viewed in FIG. 2 to insert the projection 52 into the recess 32 whereby the membrane 64 will be brought into contact with the flat face of the bottom 44 of the recess and the opening 62 in the membrane assembly will be in registry with the portion 42 of the sample passage that opens at such face.

Mounting means, generally designated 80, is provided for replaceably mounting the membrane assembly 28 in the cavity 22 so that the assembly will be firmly held adjacent to the sample cavity 42 in the manner just described. The mounting means 80 comprises an externally threaded sleeve 82 which is received in an elongated threaded opening 84 that extends from the cavity 22 to the rear face 86 of body section 14. The longitudinal axis of the opening 84 is preferably coaxial with the axis of the circular chamber 56 and with the center of the sample cavity 42. The rear of the sleeve 82 extends outwardly beyond the rear face 86 of body section 14 and is formed with a head 88 which is serrated at its outer surface 90 to facilitate threading of the sleeve 82 into the opening 84. An elongated circular passage 91 extends through the sleeve 82 for slidably receiving therein a cylindrical electrolyte container 92. The rear end 94 of container 92 extends beyond the rear of the sleeve 82 and is closed by a suitable assembly 96 including a conventional reference half cell 98 which extends into the container 92. The reference half cell is preferably a silver wire coated with silver chloride. The forward end 100 of the container 92 is somewhat enlarged to provide a rearwardly facing annular shoulder 102 which is engageable by the forwardly facing surface 104 on the end of sleeve 82. A circular recess 106 is formed in the forward end 100 of the container of such a size to slidably receive therein the projection 54 on the membrane assembly 28. As best seen in FIG. 1, the interior of the container 92 opens at the bottom of the recess 106 so that electrolyte 107 filling the container will contact the outer surface of the membrane 66 of the membrane assembly when the container 92 is pressed into sealing engagement with the assembly 28. Since the forward end surface 104 on the sleeve 82 engages the shoulder 102 on the container 92, it can be appreciated that by threading the sleeve 82 into the opening 84, the container 92 will be moved in a rightward direction as seen in FIG. 2 thus bringing the recessed forward end of the container into tight engagement with the projection 54 on the membrane assembly 28.

In order to assemble the apparatus 10, the membrane assembly 28, which is initially outside of the body 12, is filled with a suitable ion sensing solution through the filling port 70 by removing the cap 74 and inserting the needle of a syringe containing the solution thereinto. After filling the membrane assembly 28 with the sensing solution, the cap 74 is replaced on the member 50 thereby providing a completely closed membrane assembly. The sleeve 82 is threaded out of opening 84 sufficiently so that the forward end of the electrolyte container 92 will not extend into the cavity 22. The membrane assembly 28 is then dropped into the cavity and moved in the rightward direction as seen in FIG. 2 to bring the circular projection 52 into registry with the circular recess 32 in body section 16. Thereafter the sleeve 82 is threaded into the opening 84 to seal the forward end of the container 92 against the membrane covered projection 54 of the membrane assembly. With the apparatus 10 held upright, the interior of the container 92 is filled with a suitable electrolyte solution 107 and the internal half cell assembly 96 is inserted into the rear of the container 92 to close the same. By connecting the internal half cell 96 and the internal half cell of the reference electrode 46 to a suitable pH meter, the apparatus is in condition for analyzing a sample solution which is passed through the sample passage 38 in a conventional manner.

In order to determine the potassium ion activity of a sample solution, the ion sensing solution 68 in the membrane assembly 28 is preferably a lecithin-macrocyclic compound-decane solution as described in the aforementioned Canadian patent. However, any other types of sensing solution may be utilized, such as organic ion exchanger solutions as disclosed in U.S. Pat. No. 3,429,785, for determining other ions.

The various parts of the apparatus 10 are formed of suitable nonconductive materials. Preferably all parts of the apparatus except membrane assembly 28 are formed of Lucite, an acrylic polymer, and sections 14 and 16 of body 12 are bonded together by an acrylic cement. The element 50 of membrane assembly 28 is formed of a cellulosic material, such as cellulose propionate, cellulose acetate or cellulose butyrate, while the membranes 64 and 66 are preferably either cellophane or cellulose acetate.

We have found that when employing a macrocyclic containing sensing solution in the assembly 28, the membrane 64 which contacts the sample passing through passage 38 is preferably cellophane rather than cellulose acetate since the latter will decrease the span of response and selectivity of potassium ion measurements.

An important feature of the invention is the discovery of means for forming a suitable bond between the cellophane membrane 64 and the aforementioned cellulosic materials so that a sealed unitary membrane assembly may be provided which may be replaceably mounted within the cavity 22 of the body 12. We have tried various epoxies, airplane glues, rubber cement and collodion in an effort to obtain a suitable bond between cellophane and the aforementioned cellulosic materials, but none were found to be successful. We have found, however, that urethane adhesives form a good chemical bond between a cellophane membrane and cellulosic materials. Commercially available urethane adhesives which we have found suitable for this purpose are a one component water curing urethane adhesive sold under Part No. 9DDX4A by Industrial Rubber Cement Company, the City of Industry, California, and a two component urethane resin system identified as Uralane 5715 sold by Furane Plastics Incorporated of Los Angeles, Calif. In addition, even commercially available urethane varnishes have been found to provide a suitable bond between cellophane and cellulosic materials. An example of such a varnish is Satin Polyurethane Varnish 30 65590 sold by Sears Roebuck & Co.

It is preferred that the membrane 66 which contacts electrolyte 107 be formed of cellulose acetate rather than cellophane since it is less permeable to water. The cellulose acetate membrane 66 may be bonded to the member 50 of the membrane assembly either by a urethane adehesive or by heat bonding. The cellulose acetate membrane will minimize the amount of moisture in the electrolyte 107 that passes into the ion sensing solution 68 where the moisture could condense and form an electrolytic conductive path between the two membranes or condense on the cellophane membrane to slow the response of the electrode to changes in sample composition. Since the bottom of chamber 56 is sloped at 69 between its opposite ends, any water moisture which permeates through membranes 54 and 66 into the sensing solution 68 in the chamber will collect at only one end of the chamber rather than across the entire bottom surface of the chamber to form an electrolytic path between membranes.

Thus, when the sensing solution contains a macrocyclic compound, it is preferred that a cellophane membrane contact the sample solution and a cellulose acetate membrane separate the ion sensing solution from the electrolyte in the container 92, it being understood however that both membranes may be either cellophane or cellulose acetate, but with some sacrifice in the performance of the apparatus.

Reference is now made to FIGS. 3-6 in detail which illustrate a second and preferred embodiment of the invention. In this embodiment, the basic structure is as previously described and like numbers primed are used to indicate like or corresponding parts. In this embodiment, the sample passage 38' extends straight through the body 12' and passes adjacent to the cavity 22'. The sample cavity 42' connects the passage 38' to the recess 32' in the face 20' of the cavity 22'. The reference electrode 46' is mounted in the body 12' so as to communicate with sample passage 38'. The membrane assembly 28' and electrolyte container 92' are bonded together by a suitable adhesive, such as urethane adhesive, to provide a composite unitary assembly 108 which is slidably received in the cavity 22". The container 92' differs from the container 92 illustrated in FIGS. 1 and 2 in that the internal half cell assembly 98' is mounted in a port 110 that extends upwardly from the container and the container is closed at the end 112 opposite to the end which is sealed to the membrane assembly 28'. When the assembly 108 is properly positioned in the cavity 22', the membrane covered projection 52' will fit in recess 32' with the opening 62' in assembly 28' in registry with the sample cavity 42'. A circular recess 114 is formed in the closed end 112 of the container 92'. This recess is preferably coaxial with recess 32'. A set screw 80', which constitutes the mounting means of the assembly, is threadedly mounted in the wall 116 of the body 12' opposite to the sample passage 38' and is located so that its end 116 is slidably received in the recess 114 in container 92'. It can be appreciated that by simply unscrewing the set screw 80' to withdraw its end 116 from the recess 114 in container 92', the composite unitary electrolyte container and membrane assembly 108 may be removed from the cavity 22', thus permitting rapid disassembly of the apparatus without spillage of electrolyte or sensing solution.

It may be appreciated that the bonding of a cellophane membrane to a cellulose propionate, cellulose acetate or cellulose butyrate body by a urethane adhesive has applications to electrode assemblies other than those specifically described herein, as for example, to dip type electrodes in which the ion sensing solution container would be formed of one of the aforementioned cellulosic materials and the end of the container would be closed by a cellophane membrane bonded to the container by such adhesive. Such an arrangement would avoid the necessity of O-rings, clamps or the like which in the past have been found to be unsuitable to provide a good seal to prevent ionic communication between a cellophane membrane and an electrode body.

Although several embodiments of the invention have been disclosed herein for purposes of illustration, it will be understood that various changes can be made in the form, details, arrangement and proportions of the various parts and in the materials utilized in such embodiments without departing from the spirit and scope of the invention as defined by the appended claims.

What is claimed is:

1. An apparatus for measuring the ion activity of a sample solution comprising:
    a body of nonconductive material having a cavity therein;
    a sample passage extending through said body and opening at one face of said cavity;
    a unitary membrane assembly slidably received in said cavity, said assembly comprising an element of nonconductive material having a pair of opposed surfaces and a chamber therein opening at said surfaces, a hydrophilic membrane cemented to each of said surfaces to close said chamber, said chamber being adapted to hold an ion sensing solution;

means removably mounting said membrane assembly in said cavity so that one membrane covered surface of the assembly engages said one face of said cavity in sealing relationship, with said chamber in registry with the opening of said sample passage at said face;

container means formed of nonconductive material for holding an electrolyte in contact with the membrane on the other surface of said assembly; and an internal half cell positioned in said container means for contacting electrolyte therein.

2. An apparatus as set forth in claim 1 wherein said element is formed of a cellulosic material, and the membrane on said one surface is cellophane and is cemented to said element by a urethane adhesive.

3. An apparatus as set forth in claim 1 wherein the membrane on said one surface is cellophane and the other membrane is less permeable to water than said cellophane membrane.

4. An apparatus as set forth in claim 3 wherein said other membrane is formed of cellulose acetate.

5. An apparatus as set forth in claim 1 including:

a threaded opening in said body extending from the face of said cavity opposite said one face to the exterior of said body;

the longitudinal axis of said opening being generally normal to said one face of said cavity; and said mounting means comprising a member threadedly engaged in said opening and abutting said container means in a manner so that threading of said member into said opening urges said container means and said membrane assembly toward said one face of said cavity.

6. An apparatus as set forth in claim 5 wherein:

said membrane comprises a hollow sleeve provided with a surface thereon facing said one face; and said container means is slidably mounted in said sleeve, the forward end of said container means being adjacent to but separable from said membrane assembly and said container means has a rearwardly facing shoulder thereon engageable by said surface on said sleeve.

7. An apparatus as set forth in claim 6 wherein:

the rear end of said container means extends outside of said body; and said internal half cell is mounted in said rear end of said container means.

8. An apparatus as set forth in claim 5 wherein:

said container means and membrane assembly are joined together as an integral unit; and said unit is slidably received in said cavity and retained therein by said mounting means.

9. An apparatus as set forth in claim 8 wherein:

said mounting means comprises a set screw threadedly engaged in said threaded opening in said body with one end of said screw abutting said unit.

10. An ion measuring electrode assembly, said assembly including a container for holding an ion sensing solution and a cellophane membrane covering one end of said container, the improvement which comprises: said container being formed of a cellulosic material and said membrane being bonded to said container by a urethane adhesive.

* * * * *